United States Patent [19]

Nakamura et al.

[11] 4,074,589
[45] Feb. 21, 1978

[54] FOUR CYLINDER IN-LINE ENGINE WITH DRIVING BALANCER SYSTEM

[75] Inventors: Hirokazu Nakamura; Hikoichi Motoyama, both of Kyoto, Japan

[73] Assignee: Mitsubishi Jidosha Kogyo Kabushiki Kaisha, Japan

[21] Appl. No.: 614,163

[22] Filed: Sept. 17, 1975

[30] Foreign Application Priority Data

Oct. 16, 1974 Japan .................. 49-119778

[51] Int. Cl.² .............................. F16F 15/10
[52] U.S. Cl. ..................... 74/604; 123/195 A
[58] Field of Search ............... 74/604, 226, 229; 123/192 B, 195 A, 90.27, 90.31

[56] References Cited

U.S. PATENT DOCUMENTS

| | | | |
|---|---|---|---|
| 2,010,056 | 8/1935 | Brush | 74/604 X |
| 2,914,963 | 1/1959 | Scherenberg | 74/604 X |
| 3,473,399 | 10/1969 | Buchwald | 74/226 |
| 3,613,645 | 10/1971 | Froumajou | 123/195 A X |

FOREIGN PATENT DOCUMENTS

| | | | |
|---|---|---|---|
| 1,106,744 | 12/1955 | France | 123/192 B |
| 1,935,121 | 1/1971 | Germany | 123/195 A |

*Primary Examiner*—Samuel Scott
*Assistant Examiner*—R. C. Turner
*Attorney, Agent, or Firm*—Robert E. Burns; Emmanuel J. Lobato; Bruce L. Adams

[57] ABSTRACT

An apparatus for driving at least a pair of balancers which are disposed on both sides of an engine substantially parallel to the crank shaft and so arranged as to rotate in opposite directions at a speed twice the rotating speed of the crank shaft, comprising a gear shaft for reversing one of the balancers and a driving mechanism for driving the other balancer and the camshaft by the crank shaft through a single timing belt or chain, provided in the front or rear part of the cylinder block, in order to dispense with the need of providing separate driving mechanisms for the camshaft and the balancers.

2 Claims, 4 Drawing Figures

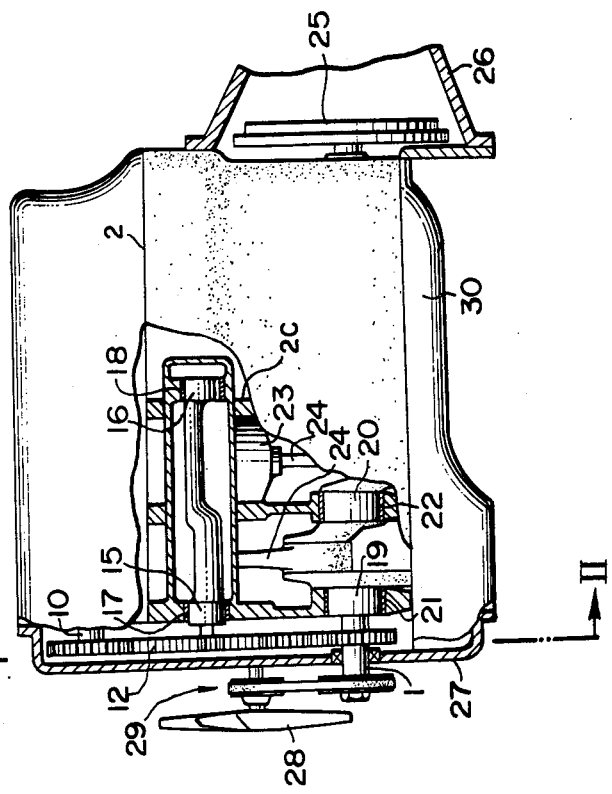
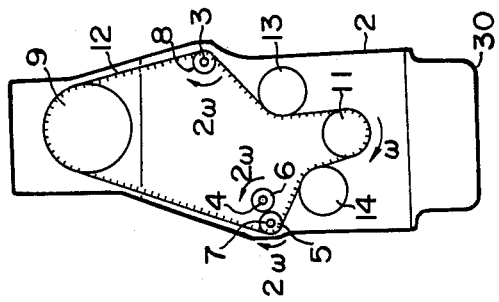

FOUR CYLINDER IN-LINE ENGINE WITH DRIVING BALANCER SYSTEM

BACKGROUND OF THE INVENTION

This invention relates to improvements in apparatus for driving engine balancers.

For a conventional in-line four cylinder engine, various means to eliminate vertical secondary vibromotive force so as to prevent the vibration of the engine have been proposed. But no apparatus has been available that eliminates secondary vibromotive momentum due to reciprocating mass and vibromotive momentum due to explosion torque. In order to obviate this disadvantage, the present applicant proposed an invention for which a patent is being applied under U.S. patent application Ser. No. 527,780, filed Nov. 27, 1974. Now this invention further improves the balancer driving mechanism proposed in the aforesaid prior pending application.

In an engine of the conventional type, as is commonly known, balancer driving mechanism is provided in the front part thereof, separate from timing gears for the camshaft. In addition, water pump, cooling fan and driving mechanisms such as a dynamo are arranged in tandem along the axis of the crankshaft. This not only increases the entire length of the engine, but also makes its assembly and maintenance complex since so many components as mentioned above are placed in a very small space.

SUMMARY OF THE INVENTION

This invention is proposed to eliminate the aforementioned shortcomings. More particularly, the primary feature of this invention lies in an apparatus for a driving engine balancer mechanism in which at least a pair of balancers are disposed on lines that are on both sides of, at desired distances, and substantially parallel to the axis of the crank shaft. In this driving mechanism, the pair of balancers are at distance from each other with respect to the axis of the cylinders, and are so designed as to rotate opposite to each other, at a speed twice the rotating speed of the crank shaft. A gear shaft reversing one of the pair of balancers, and a driving mechanism driving the other balancer shaft as well as the camshaft and so on through a single elongated positive driving member such as a timing belt or a timing chain by means of the crank shaft, are disposed in the front or rear part of the cylinder block.

BRIEF DESCRIPTION OF THE DRAWINGS

Now this invention will be described in detail with reference to the accompanying drawings, in which:

FIG. 1 is a schematic view of an embodiment of this invention, with a part thereof cut open.

FIG. 2 is an end view, taken with certain parts removed and as seen in the direction of arrow II—II in FIG. 1.

DESCRIPTION OF THE PREFERRED EMBODIMENTS

Figure 4:
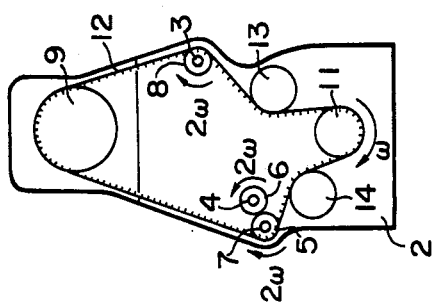
FIG. 4 is an end view generally similar to FIG. 2 but looking in the direction of arrow IV—IV in FIG. 3.

Referring first to FIGS. 1 and 2, an embodiment of this invention will be described in detail.

A crank shaft 1 is fitted in a cylinder block 2. At least a pair of balancer shafts 3 and 4 are disposed on lines that are on both sides of, at desired distances, and substantially parallel to the axis of the crank shaft 1. The pair of balancer shafts 3 and 4 are spaced at distance from each other with respect to the axis of the cylinders 2C in block 2 and are so designed as to rotate opposite to each other, at a speed $2\omega$ twice the rotating speed $\omega$ of the crank shaft 1, as illustrated in FIG. 1.

Item 5 is a belt pulley fitted to the shaft 7 of a reversing gear, not shown, that meshes with a gear 6 fitted to the balancer shaft 4. Reference numeral 8 denotes a belt pulley fitted to said balancer shaft 3, 9 a belt pulley fitted to a camshaft 10. 11 is a belt pulley fitted to crank shaft 1. 12 is a timing belt engaged with belt pulleys 5, 8, 9 and 11. The pulleys are rigidly fitted to their respective shafts. to FIG. 2 but 13 and 14 are an idler and a tensioner, respectively, of said timing belt 12. Journals 19 and 20 of the crank shaft 1 are supported in bearings 21 and 22, respectively. A piston 23 in cylinder 2C is fitted to the end of a connecting rod 24 supported by the crank shaft 1. Reference numeral 25 designates a flywheel, 26 a bell housing, and 27 a timing gear case fitted in the front part of the cylinder block 2. 28 is a cooling fan operated by a belt driving mechanism 29 connected with the crank shaft 1, and 30 an oil pan.

In the embodiment of this invention thus composed, the balancer shafts 3 and 4 are driven, when the engine operates, by the single timing belt 12 through the belt pulleys 5, 8, 9 and 11. This dispenses with the need of providing separate driving mechanisms for the camshaft and the balancers, it is thereby in contrast to the conventional apparatus. Accordingly, the apparatus of this invention can be placed compactly in a small space in the front part of the engine, thus reducing its manufacturing cost and increasing its maintainability. Further, it can eliminate secondary vibromotive force and momentum due to reciprocating mass and explosion torque simultaneously and remarkably. As is evident from above, this invention offers excellent operations and results.

Figure 3:
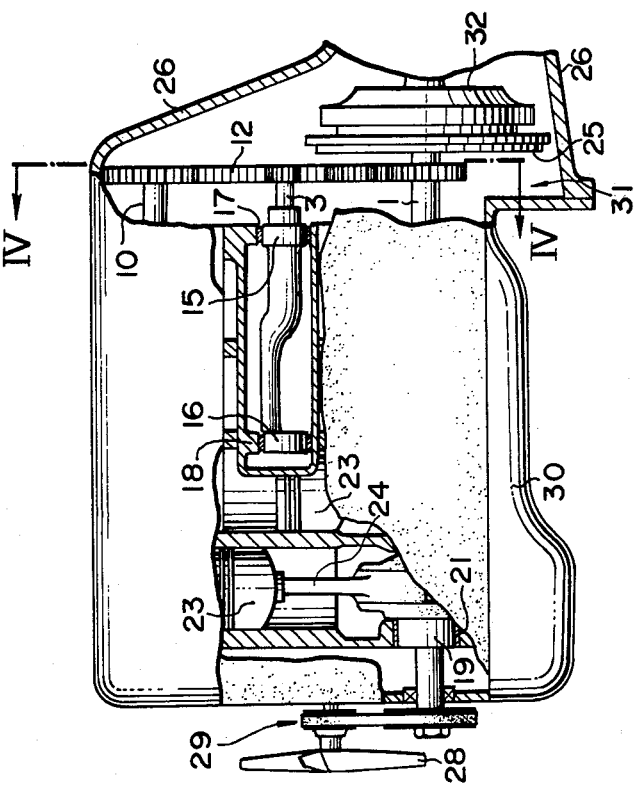
FIG. 3 is a schematic view showing another application of this invention, with a part thereof cut open.

Now an example in which the above-described embodiment of this invention is applied will be described with reference to FIGS. 3 and 4, wherein parts similar to those in FIGS. 1 and 2 are designated by similar reference numerals.

In this example, the balancer driving mechanism of this invention is placed in the rear part 31 of the cylinder block, whereas this mechanism was provided in the front part thereof in FIGS. 1 and 2. This arrangement necessitates only expanding the bell housing 26 upwards, for enclosing a clutch 32 and the timing belt 12 as shown in FIG. 3, while the timing gear case 27 of the first embodiment is no longer necessary. Therefore, the conventional forward extension of the engine, in the longitudinal direction of the crank shaft and for separate driving mechanisms for the cam shaft and the balancers, can be reduced, as in the first embodiment of this invention. Also, maintainability of the engine is improved because only the cooling fan and some auxiliary components such as the dynamo (not shown) are provided in the front part of the engine.

Instead of the timing belt used in the above-mentioned example, other endless timing members can be substituted. For example, sprockets and a chain may be used. Also, the same operations and results can be obtained when this invention is used for a horizontal engine.

What is claimed is:

1. A cylinder and piston engine, comprising;
a cylinder block;
a crankshaft disposed therein and having cylinder and piston means for rotating it at a crankshaft speed;
a cam shaft for timing intake and exhaust operations in the cylinder means; and
a balancer system for balancing vibromotive forces acting on the cylinder block on operation of the piston means, the system comprising first and second balancer shafts laterally spaced from the crankshaft on two sides of that shaft and substantially parallel thereto, and a timing mechanism disposed at an end of the cylinder block and driven by the crankshaft for driving the balancer shafts and also the cam shaft, the timing mechanism comprising a single elongate endless member engaging the several shafts to drive the first and second balancer shafts in directions opposite to one another, both at a speed equal to twice the crankshaft speed, and
wherein the timing mechanism includes a gear fitted to one of the balancer shafts to drive the shaft, and a gear shaft having idler gear means fitted thereto to be driven thereby and meshing with said gear, said elongate endless member being enabled to drive the gear shaft and the other balancer shaft to effect the rotating of the balancer shafts in opposite directions, and also to drive the cam shaft.

2. An engine according to claim 1, in which the timing mechanism also includes a plurality of belt pulleys, each rigidly fitted to one of the following: the gear shaft, the other balancer shaft, the cam shaft, and the crank shaft, the belt pulleys fitted to the first two of these shafts being one-half as large as the belt pulley fitted to the crank shaft, and the elongate endless member being a timing belt for driving the balancer shafts and the cam shaft by the crank shaft and for thereby producing the speed of the balancer shafts equal to twice the crank shaft speed.

* * * * *